L. H. PAGE.
PLANTER AND PLANT-SETTER.

No. 173,049. Patented Feb. 1, 1876.

Witnesses.
A. Ruppert.
S. P. Hollingsworth

L. H. Page
Inventor.
D. P. Holloway & Co.
Atty.

UNITED STATES PATENT OFFICE.

LEVI H. PAGE, OF CHICAGO, ILLINOIS, ASSIGNOR TO MARK CAMPBELL, OF SAME PLACE.

IMPROVEMENT IN PLANTERS AND PLANT-SETTERS.

Specification forming part of Letters Patent No. 173,049, dated February 1, 1876; application filed January 24, 1876.

*To all whom it may concern:*

Be it known that I, LEVI H. PAGE, of Chicago, in the county of Cook and State of Illinois, have invented a new and useful Improvement in Planters and Plant-Setters, of which the following is a specification:

This machine is convertible to use either as a planter for depositing bulbs or seeds in the earth, or as a plant-setter for planting young plants or shrubs. For the former purpose a hopper (shown in Fig. 4) is attached. In the latter use it is detached.

Figure 1:
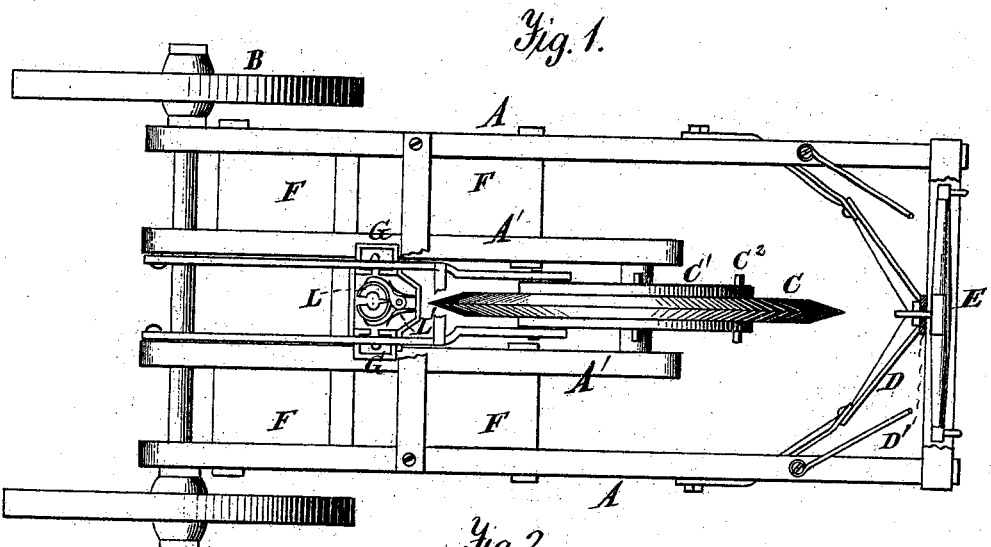
Figure 2:
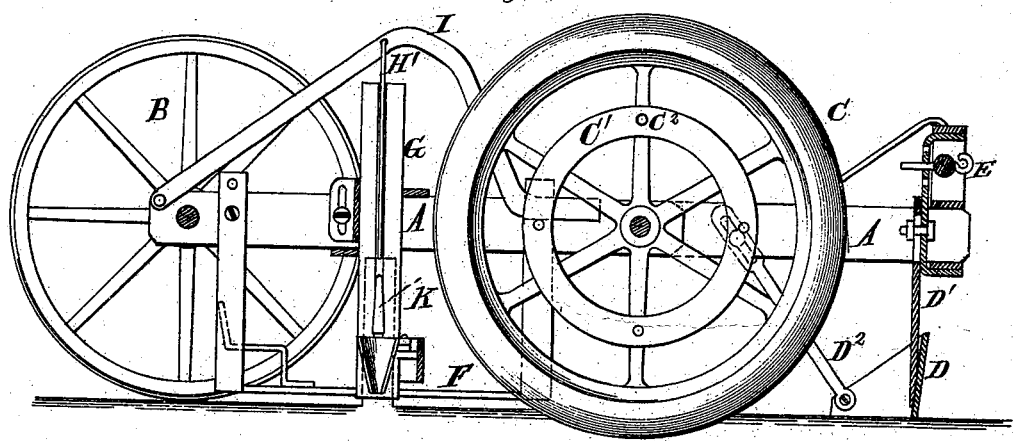
Figure 3:
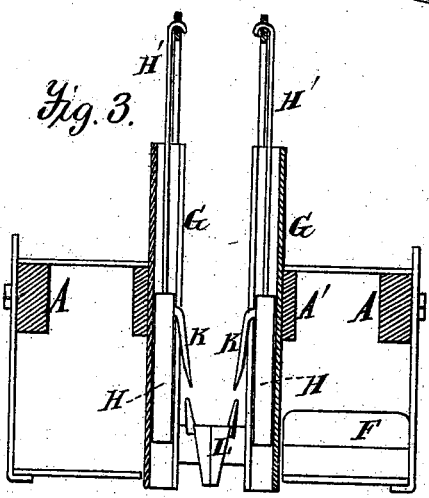
Figure 4:
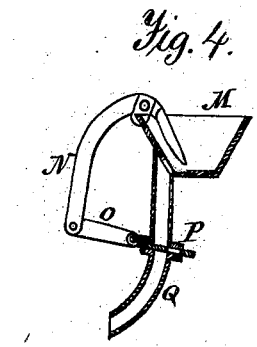

In the annexed drawings, making part of this specification, Figure 1 is a plan view, Fig. 2 is a sectional elevation, and Fig. 3 is a transverse section, of the machine when used as a plant-setter; and Fig. 4 is a vertical section of a hopper, which is attached (resting on the frame) immediately behind the plunger-cases, when the machine is to be used as a seed-planter.

The same letters are employed in all the figures in the indication of identical parts.

A is the frame, formed of two side pieces and two shorter parallel pieces, A', which support the mechanism, resting at the rear upon the axle of the wheels B B, and in front upon the axle of the wheel C. This is a heavy iron wheel, having its periphery beveled to a sharp edge, intended to mark a channel in the ground, in which the seeds or plants are to be deposited. On the front of the frame is the track-clearer D, adjustably supported upon the rod $D^1$ and braced by the rods $D^2$. These rods are fastened to the frame by bolts passing through elongated eyes, and by their means the track-clearer may be adjusted vertically to correspond with the depth of planting. On each side of the frame is adjustably suspended a platform, F, intended to carry the plants and the men employed in planting. Two vertical boxes, G G, are adjustably attached to the inner frame A' A'. These contain iron plungers H, sliding freely up and down in the boxes, and suspended upon the two rods H' H', respectively attached to the levers I. These levers are pivoted at the rear of the frame and bent, as shown, extending forward so that their bent ends extend across the annular plates $C^1$, attached to the spokes of wheel C, and having passed through them pins $C^2$, which project on each side, and simultaneously raise the two levers I I and disengage them, so that the two plungers may fall at the same time.

Bent rods having their outer ends flattened are shown at K K projecting from the plungers through vertical slits in the sides of the plunger-boxes. As these descend they engage lugs upon the sides of the sectional and hinged cup L. This cup is made in two pieces, joined by a hinge in front, and held normally closed by means of springs L' L', bearing against the respective sections. The cup is funnel-shaped, and made to hold the plants until deposited in the ground, when, being opened by the action of the arms K K, the plant may pass out behind. Instantly after the opening of the jaws, or simultaneously therewith, the plungers, falling upon the ridges of earth on each side of the plant, formed by the wheel C, will force it against the plant on each side, and so give support to it.

When the machine is adapted for planting seeds the hopper M is to be attached behind the plunger-boxes. The bent arm N on the inside covers the seed-pipe, and on the outside actuates the link O and slide-valve P in the seed-pipe Q. It is actuated by rods connected from the levers I to the bent arm N, and the openings out of the hopper into the seed-pipe, and that closed by the valve in the pipe, are alternately closed and opened, so that the seed, at one movement, falls from the hopper onto the valve, and at the next from the valve into the cup L, whence, on the opening of the cup, it is dropped into the furrow and covered by the action of the plungers.

I have shown the principle as applied to a single-row planter. It is, however, obvious that two or more rows can be planted by a machine provided with two or more wheels C, cups L, &c. My claims are, therefore, not limited to a single-row machine.

What I claim as my invention, and desire to secure by Letters Patent, is—

1. The wheel C, feather-edged and combined with the hinged planting-cup L, for opening the furrow and depositing the plants, substantially as set forth.

2. The combination of the hinged planting-cup L, the wheel C, and the track-clearer D, substantially as set forth.

3. The combination of the wheel C, hinged cup L, and plungers H, substantially as set forth.

4. In combination with the hinged sectional cup L, the reciprocating plungers and arms K, for opening the cup, substantially as set forth.

5. In combination, the cup L, the plungers H, rods H', arms K, and reciprocating levers I, substantially as set forth.

6. In combination with the adjustably-suspended sectional cup L, the adjustably-suspended track-clearer, and intermediate wheel, whereby the parts may be conformed to the requirements of the depth of the furrow, substantially as set forth.

In testimony whereof I have signed my name to this specification in the presence of two subscribing witnesses.

LEVI H. PAGE.

Witnesses:
J. FRED. MARSHALL,
MARK CAMPBELL.